United States Patent
Hemker (10) Patent No.: US 9,914,406 B1
(45) Date of Patent: Mar. 13, 2018

(54) SCREW COVER SERVICEABILITY FEATURE

(71) Applicant: Toyota Engineering & Manufacturing North America, Inc., Erlanger, KY (US)

(72) Inventor: Christopher J. Hemker, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/471,547

(22) Filed: Mar. 28, 2017

(51) Int. Cl.
*B60N 2/46* (2006.01)
*B60R 13/02* (2006.01)

(52) U.S. Cl.
CPC .......... *B60R 13/0243* (2013.01); *B60N 2/466* (2013.01)

(58) Field of Classification Search
CPC ....... B60N 2/466; B60J 5/0413; B60J 5/0468; B60R 13/0237; B60R 13/0243; B60R 2013/0281; B60R 2013/0293
USPC ...................................................... 296/146.7
See application file for complete search history.

(56) References Cited

U.S. PATENT DOCUMENTS

| | | | |
|---|---|---|---|
| 5,803,415 A * | 9/1998 | Konishi | B60N 2/466 248/118 |
| 6,929,309 B1 * | 8/2005 | Radu | B60R 13/0243 296/146.7 |
| 7,121,611 B2 * | 10/2006 | Hirotani | B60J 5/0451 280/751 |
| 2005/0161143 A1 * | 7/2005 | Evans | B29C 45/0055 156/73.1 |
| 2014/0346799 A1 * | 11/2014 | Balla | B60R 13/0206 296/1.08 |
| 2015/0097391 A1 * | 4/2015 | Thiele | B60R 13/0275 296/146.7 |
| 2015/0291010 A1 * | 10/2015 | Gillay | B60J 5/0416 296/146.7 |

FOREIGN PATENT DOCUMENTS

| | | |
|---|---|---|
| CN | 201476876 U | 5/2010 |
| KR | 100552535 B1 | 2/2006 |

* cited by examiner

*Primary Examiner* — Gregory Blankenship
(74) *Attorney, Agent, or Firm* — Dinsmore & Shohl LLP (57) ABSTRACT

A vehicular passenger compartment trim panel assembly, a vehicular door assembly and a method of removing a vehicular passenger compartment trim panel assembly. The assembly includes a trim panel and a retention assembly where the retention assembly includes a fastener and a fastener cover. The fastener cover is sized and shaped such that when the fastener cover is secured within an aperture that is formed in the trim panel, a gap formed between them that is visible around a periphery of the A-surface defines a substantially constant width. In addition, a through-the-thickness dimension of the fastener cover includes a localized thinning in a portion of the periphery that is adjacent the clip. Such construction permits tool-free engagement of the fastener cover at the localized thinning so that the gap may be widened in response to such engagement so that the clip becomes disengaged to permit access to a screw or related fastener that is situated underneath the fastener cover.

20 Claims, 6 Drawing Sheets

SCREW COVER SERVICEABILITY FEATURE

TECHNICAL FIELD

The present specification relates generally to fastener covers used in vehicular applications, and more particularly to covers that provide improvements in cover removal and aesthetic appearance.

BACKGROUND

Many of the structural components that envelope a vehicular passenger compartment are covered in decorative trim panels as a way to improve the vehicle interior's aesthetic attributes. In one well-known manner, the visible layer that faces the passenger compartment forms what is referred to as the A-surface, while the non-visible layer that faces away from the passenger compartment and toward the supporting vehicular structure is referred to as the B-surface. In one form, such a trim panel may be fastened to an inner door panel, door frame or other structural member as a way to provide visual and physical separation between the passenger and the wiring, ductwork, window motor, door opening and locking assemblies and related internal components that are contained within the door.

Screws are a commonly-used fastening device for securing the trim panel to the underlying vehicular structure. In one form, these screws can be unsightly, while in another, they may protrude into the passenger compartment to form a risk of snagging, scratching or related harm. To alleviate this, it is well-known to provide a screw cover. When service personnel need to perform repair on the door or one or more components or assemblies contained within that are obscured by the trim panel, these screw covers must first be removed in order to gain access to and removal of the screws underneath. Notches or related visible openings formed in these screw covers are sized to receive the tip of a screwdriver, knife or other similarly-shaped tool. Upon placement of the tip of the tool into the notch and subsequent prying motion, the cover can be made to either pop out of or swing away from the complementary-shaped cutout in the door trim. Unfortunately, the relatively large notches—some of which may be as wide as 8 millimeters or more—tend to be unsightly, while the use of a rigid screwdriver tip on a relatively compliant notch tends to leave marks or scratches around—or even deformation to—the region of the cover adjacent the notch. Furthermore, the use of tools to remove the screw covers complicates the repair or service procedure.

The author of the present disclosure has determined that an improved screw cover for vehicular A-surface trim panels is warranted.

SUMMARY

In one embodiment, a vehicular passenger compartment trim panel assembly is disclosed. The assembly includes a trim panel and a retention assembly. The trim panel is made up of an A-surface defining one or more apertures formed therein, a B-surface and a locking projection that extends into the aperture. The retention assembly includes a fastener and a fastener cover. The fastener cover is disposed within the aperture and includes a B-surface with at least one clip formed thereon such that the clip forms an interference fit with the locking projection of the trim panel. The fastener cover further includes an A-surface that is sized and shaped such that when the fastener cover is secured within the aperture, a gap formed between them that is visible around a periphery of the A-surface defines a substantially constant width over such periphery. In addition, a through-the-thickness dimension of the fastener cover extends from its A-surface to its B-surface around the periphery, and includes a localized thinning in a portion of the periphery that is adjacent the clip. Such construction permits tool-free engagement of the fastener cover at the localized thinning so that the gap may be widened in response to such engagement so that the clip becomes disengaged from the projection through an amount of movement sufficient to remove the interference fit.

In another embodiment, a vehicular door assembly is disclosed. The door assembly includes a door, a trim panel and a retention assembly. The door includes an exterior surface and a frame disposed adjacent the outer surface to provide support to the exterior surface. The trim panel is secured to the frame and includes an A-surface and a B-surface as previously described. The trim panel construction is such that tool-free engagement of a fastener cover takes advantage of localized thinning within the cover so that a gap formed between the cover and an adjacent surface of the trim panel may be widened in response to such engagement so to remove the cover in the manner discussed previously.

In yet another embodiment, a method of removing a vehicular passenger compartment trim panel is disclosed. The method includes locating a fastener cover on the trim panel, inserting a fingernail into a gap formed between the fastener cover and the trim panel, prying the gap open an amount sufficient to move the fastener cover such that an interference fit that is formed between the fastener cover and the trim panel becomes disengaged, moving the fastener cover an amount sufficient to provide line-of-sight access to a fastener that secures the trim panel to a vehicular structure, unsecuring the fastener and removing the trim panel from the vehicular structure. In particular, the gap defines a substantially constant width over the portion of the periphery of the fastener cover that is exposed to the passenger compartment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to fastener covers that are used on the A-surface of a trim panel within a vehicle passenger compartment. The covers include a localized thinning in the through-the-thickness dimension such that when placed adjacent a portion of a trim panel that possesses a greater degree of structural compliance than the fastener cover, service personnel may merely use a fingernail with which to pry open the cover at the localized thinning for removal of or access to a fastener disposed underneath. Not only does the cover permit its tool-free removal, it also avoids the use of unsightly markings on the A-surface by avoiding a visibly-enlarged notch or gap between the cover and the surrounding A-surface of the trim panel.

Figure 1:
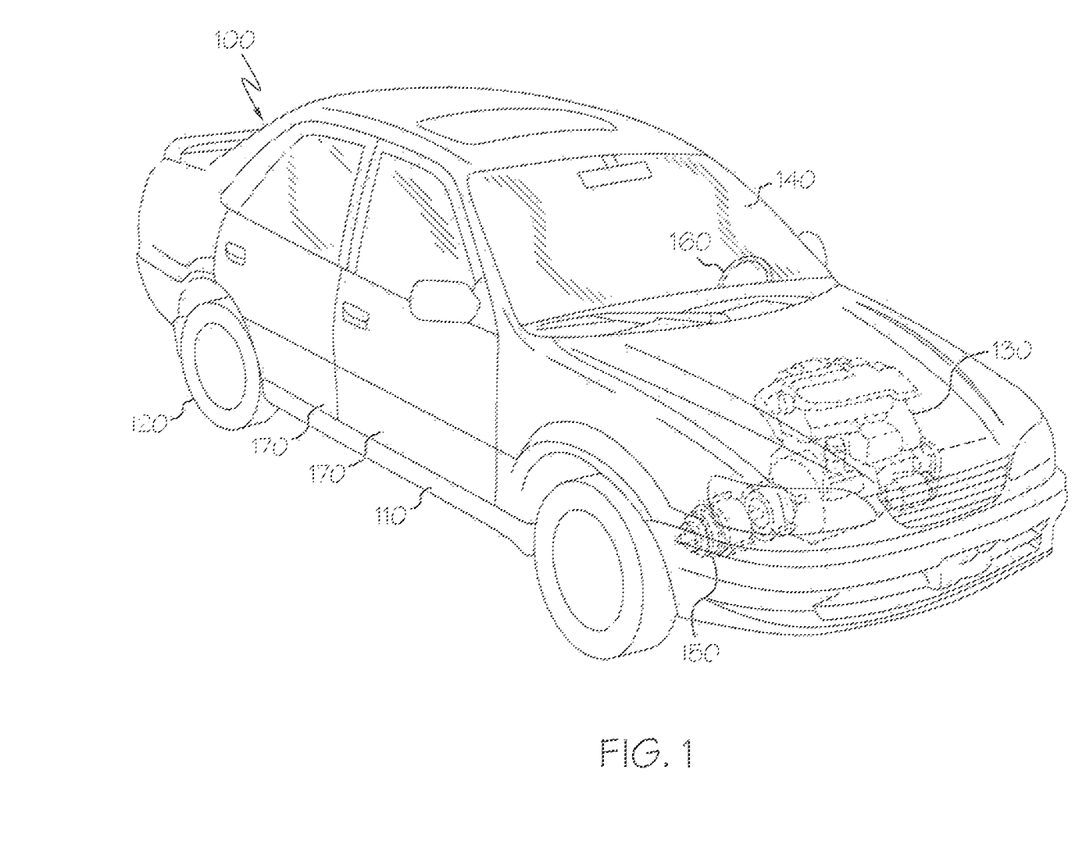
FIG. 1 depicts a vehicle that includes a screw cover for passenger compartment trim panels in accordance with one or more embodiments shown or described herein.

Referring first to FIG. 1, a vehicle 100 includes a chassis 110 with a plurality of wheels 120. Chassis 110 may either be of body-on-frame or unibody construction, and both configurations are deemed to be within the scope of the present disclosure. A motive power unit 130 such as a conventional internal combustion engine (ICE), battery pack, fuel cell stack or a hybrid combination of one or more of the above may be situated in or on the chassis 110 to provide propulsive power to the vehicle 100. As shown, the motive power unit 130 is situated underneath a hood that is placed at the fore end of vehicle 100. A passenger compartment 140 is formed inside the chassis 110 and serves not only as a place to transport passengers and cargo, but also as a place from which a driver may operate vehicle 100. A transmission 150 is coupled to the motive power unit 130 such that together they form a drivetrain through which a torque may be applied to some or all of the wheels 120. A guidance apparatus (which may include, among other things, steering wheel, accelerator, brakes or the like) 160 is used in cooperation with the wheels 120, motive power unit 130, transmission 150 and other systems to control movement of the vehicle 100.

Doors 170 permit driver and passenger ingress and egress, and in one form are made from an assembly that includes a structural frame with a sheet metal exterior panel (as shown) along with one or more interior panels, all of which are attached to the frame. Various components (none of which are shown) are affixed to the door 170, including a window and a motor for selectively raising and lowering the window, door locking mechanisms, electrical wiring, audio speakers, heating, ventilation and air conditioning (HVAC) ducting or the like.

Figure 2:
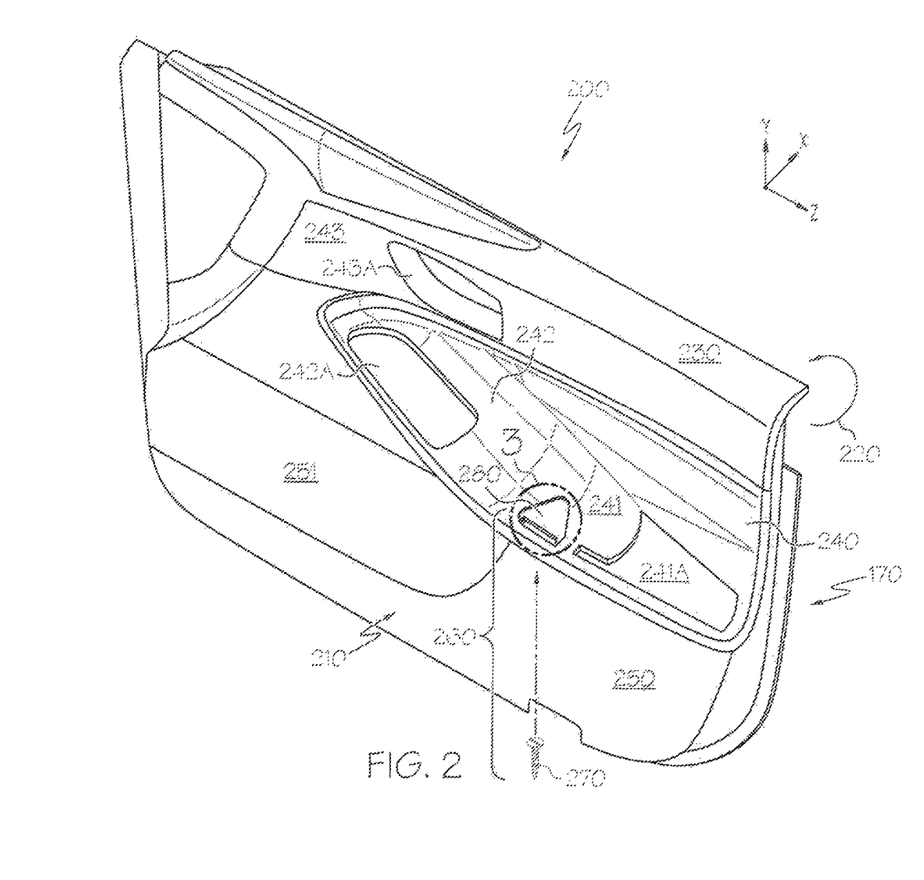
FIG. 2 depicts a perspective view of a door trim panel with screw cover that may be installed in the vehicle of FIG. 1.

Referring next to FIG. 2, a perspective interior view of one of the doors 170 as viewed from the passenger compartment 140 is shown. In particular, trim panel 200 is presently shown as being mountable to a front passenger-side door 170, although it will be appreciated that it could be mounted to other doors such as rear passenger-side door or driver-side front or rear doors. Details associated with one form of interior panel (also referred to herein as trim panel) 200 is shown, where the trim panel 200 is fastened to either the door frame or an inner door panel (neither of which are shown) in order to provide an aesthetically pleasing appearance and user functionality such as window switches, door lock switches, mirror adjust switches or the like in passenger compartment 140. As such, these trim panels 200 provide a visual and actual barrier between vehicle occupants within the passenger compartment 140 and the various components contained within the door internal structure. It will be appreciated that while the trim panel 200 is shown as a door trim panel, other forms of interior panels may be placed within passenger compartment 140, and that all such panels may be constructed with known fastening approaches that may be covered in the manner discussed herein, and that all such panels and their variants are deemed to be within the scope of the present disclosure.

At least a portion of the trim panel 200 defines an A-surface 210 and a B-surface 220, where the former is substantially exposed to passenger compartment 140, while the latter is substantially exposed to an interior cavity, beams and related door 170 structure. In one form, at least portions of the A-surface 210 may be constructed to define a repeating pattern or related textured finish, while other portions may define a contrasting or otherwise dissimilar texture in order to enhance the aesthetic appearance of the trim panel 200. Moreover, the A-surface 210 texture may be defined by a relatively smooth pattern (made from wood, plastic, metal or other suitable material), a fabric pattern, a leather pattern, a vinyl pattern or the like. In one form, the trim panel 200 may be defined by multiple separate regions including an upper region 230, a middle region 240 and a lower region 250, all or some of which may be made from the same or different materials including resins (that is to say, plastics), wood, metals, composites or the like that may form the A-surface or act as a substrate for the A-surface materials discussed previously. In this latter form, a resin-based veneer (for example, a vinyl-based material) may be vacuum-formed over a rigid or semi-rigid substrate in order to help the various regions 230, 240, 250 define a certain feel, texture or appearance in the A-surface. The middle region 240 includes an armrest-accepting portion 241, a door grip-accepting portion 242 and a door handle-accepting portion 243 where all three portions are presently shown with respective cutouts 241A, 242A and 243A formed within the trim panel 200 where the respective components that are attachable thereto have been removed in the figure for visual clarity. The lower portion 250 includes a door pocket 251 and an optional cutout (not shown) for an audio speaker.

In one form, the trim panel 200 includes a retention assembly 260 that is made up of one or more fasteners 270 (presently shown as a screw) and a fastener cover 280. Within the present context, the terms "fastener cover" and "screw cover" are meant to be used interchangeably without any loss in generality or specificity; as such, in the event that the underlying fastener 270 is something other than a screw, it will be understood that the descriptive nature of such cover 280 as a screw cover does not detract from its construction and fastener-covering function as discussed herein. For example, other suitable fasteners may also be used, such as push pins, Christmas tree or other known devices. Likewise, other locations (not shown) may be used to define a retention assembly in order to secure the trim panel 200 to the frame or other structural member within door 170. It will be appreciated that these and other retention assemblies may be used to secure any A-surface trim panel to structure on various locations within the passenger compartment 140.

Figure 3A:
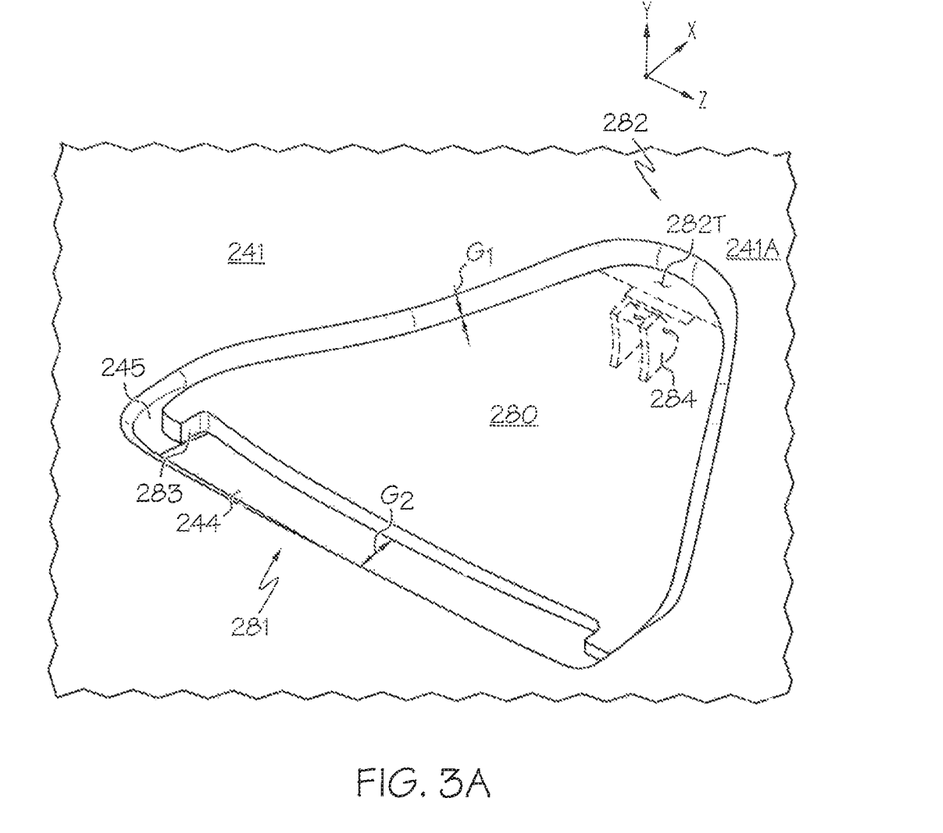
FIG. 3A depicts a top perspective view of the screw cover of FIGS. 2A and 2B.
Figure 3B:
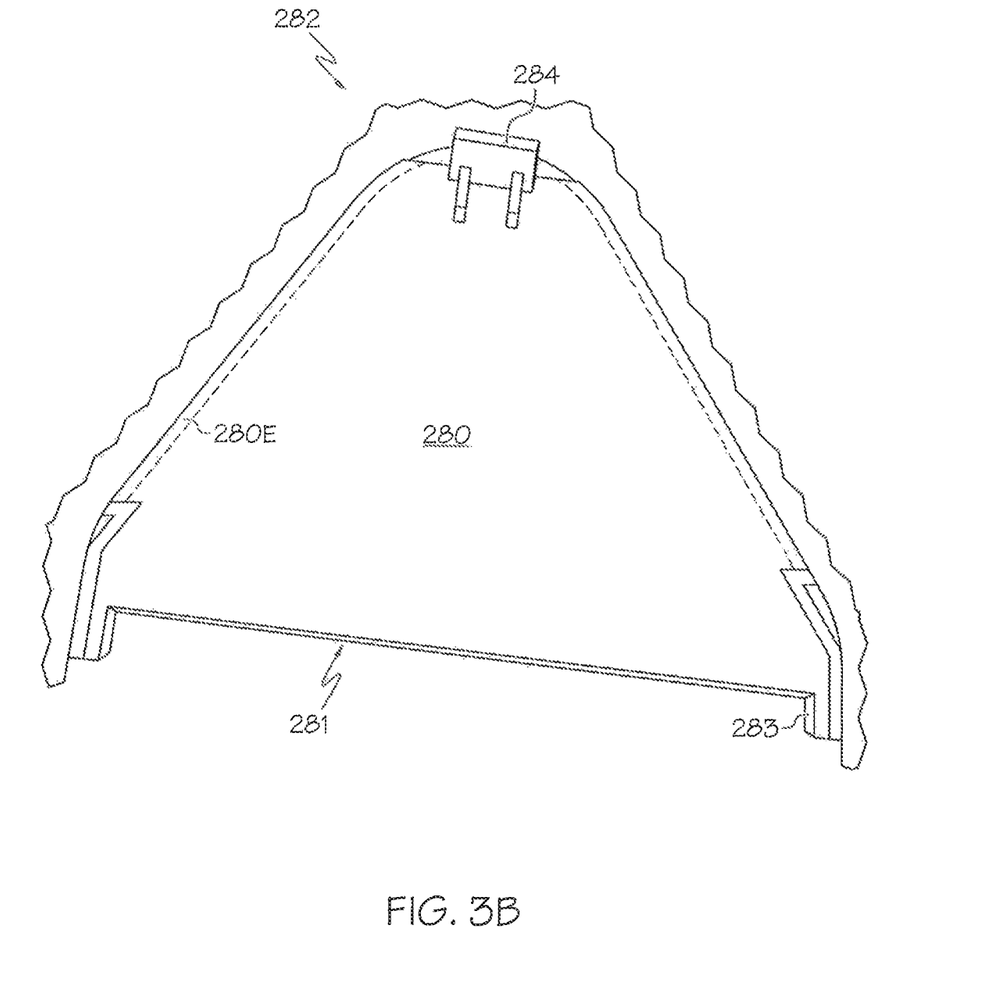
FIG. 3B depicts a bottom perspective view of the screw cover of FIGS. 2A and 2B.

Referring next to FIGS. 3A and 3B, one form of the general shape of the screw cover 280 is shown in both top (that is to say, A-surface 280A) and bottom (that is to say, B-surface 280B) views. Although shown as having a generally triangular shape, it will be appreciated that other shapes useful in covering the screw 270 are equally applicable, and that all variants are within the scope of the present disclosure. In one form, the screw cover 280 is made of an injection-moldable material, such as polypropylene (PP) with a modulus of elasticity E of about 220 ksi to about 300 ksi, high density polyethylene (HDPE, E of about 200 ksi), low density polyethylene (LDPE, E of about 30 ksi), polystyrene (PS, E of about 425 ksi to about 500 ksi), polyethylene terephthalate (PET, E of about 300 ksi to about 350 ksi), polyurethane (PU, E of about 22 ksi for a foam with a density of about 0.32 grams per cubic centimeter and less for lower density foams) or other suitable thermoplastic or thermosetting resin. Although not shown, the screw cover 280 may include a thin veneer of fabric, leather, vinyl or other suitable A-surface material in a manner generally similar to that discussed previously for the trim panel 200.

In one form, at least the portion of the trim panel 200 that surrounds the fastener cover 280 is made to be more structurally compliant that that of the fastener cover 280. Within the present context, the higher degree of structural compliance is construed as the inverse of stiffness or rigidity. As such, various components with materials that have a higher E are generally deemed to have a lower degree of compliance, while components with materials that have a lower modulus of elasticity are generally deemed to have a higher degree of compliance. Likewise, components that through selective placement or orientation take advantage of known beam stiffness and moment of inertia properties of in order to promote or inhibit flexural movement about a particular axis maybe used in order to promote a lesser or greater degree of component rigidity; an example of such a component is the integrally-formed interference fit-based clip 284 that is shown in conjunction with FIG. 3B. Furthermore, tailored amounts of compliance or rigidity can be attained by manipulation of one or both of material choices and structural orientation or placement, and that all such approaches to achieving such levels of compliance or stiffness are deemed to be within the scope of the present disclosure.

Screw cover 280 is shown in space where the Cartesian coordinates include orthogonal directions associated with the traditional length along the X-axis that generally corresponds to the dimension that extends from a proximal end 281 to a distal end 282 as shown. Similarly, the Cartesian coordinates depicted herein extend along the width (that is to say, lateral) direction associated with the Z-axis and height direction along the Y-axis the latter of which corresponds to a through-the-thickness dimension of screw cover 280. As such, reference to a particular movement, placement or location of a portion of screw cover 280 will be understood to be within the context of the Cartesian coordinates discussed herein, and that slight deviations from the same due to minor misalignment relative to such spatial reference system are permissible without any loss in generality.

The screw cover 280 fits within a complementary-shaped aperture (also referred to herein as a pull cup slot) 244 in the armrest-accepting portion 241 of the middle region 240 of trim panel 200. A lip or ledge 245 (a small portion of which may be seen in FIG. 3A) defines an underlying picture-frame like border formed in the aperture 244 for engagement of a peripheral edge 280E (which may be seen in FIG. 3B) of the underside of the screw cover 280. It will be understood that the peripheral edge 280E occupies the A-surface of the screw cover 280 as well as that of the B-surface shown in FIG. 3B. Within the present context, the term "peripheral edge" does not necessarily imply that such edge must extend around the entirety of the perimeter of the screw cover 280, but that such extension occupies at least a majority of the perimeter of the screw cover 280 that forms an adjacently-facing contact with the ledge 245. For example, as can be seen, certain regions (most notably the region near the proximal end 281) of the edge 280E may need to be absent in order to facilitate various types of cover 280 movement such as the frictional placement at the proximal end 281, as well as for taking advantage of the local thinning 282T at the distal end 282 as discussed in more detail as follows. Moreover, portions or regions where no such periphery or peripheral edge are present generally coincide with those regions within screw cover 280 that are not visibly exposed to the passenger compartment 140; by way of example, in a configuration where screw cover 280 is disposed in a door trim panel 200 such as that of FIG. 2, the region of screw cover 280 that coincides with the proximal end 281 would be obscured by an armrest and as such would not be visibly exposed to the passenger compartment 140.

When the screw cover 280 is inserted into aperture 244, a small gap G1 is formed between their adjacently-facing edges, while a larger gap G2 may optionally be present near the proximal end 281 in order to facilitate selective screw cover 280 movement along the X-axis. In one form, the smaller gap G1 defines a substantially constant width over the periphery that coincides with the visibly exposed portion of the edge 280E. In another form, the smaller gap G1 defines a substantially constant width over the entirety of such periphery that is within view of a passenger seated within the passenger compartment 140. Significantly, there is no additional notch or accentuated gap along such periphery in general and at the distal end 282 in particular with which to receive a screwdriver tip or other tool. In this way, the portion of the screw cover 280 that is within view of an occupant in the passenger compartment 140 with the exposed gap G1 is as visually unobtrusive (and therefore as aesthetically-pleasing) as possible.

As shown with particularity in FIG. 3B, this underside portion includes one or more frictionally fitting locator tabs 283 at the proximal end 281 and one or more integrally-formed interference fit-based clips 284 that perform a latching function of the distal end 282. The locator tabs 283 are sized and shaped to provide insertion into the complementary pull cup slots that make up the aperture 244. In another form, the locator tabs 283 may form a frictional fit against an adjacent wall of the trim panel 200 so that the screw cover 280 remains securely in place until a translational force imparted from a service personnel's fingernail causes translational movement of the screw cover 280 along the X-axis. Significantly, the through-the-thickness dimension 280T that coincides with the Y-axis of the screw cover 280 includes a thinned portion 282T in the region associated with the distal end 282. In one form, the thinned portion 282T is molded into the screw cover 280 as a step that, by virtue of not being in contact with the ledge 245, works in conjunction with the inherent compliance of the surrounding trim panel 200 A-surface to promote easier fingernail access and associated more pronounced flexural response within the adjacent relatively compliant portion of the trim panel 200 as a way to allow service personnel to gain access to the underlying screw 270 that is disposed underneath the cover 280. In particular, the localized compliant zone makes it easier for service personnel to use a fingernail with which to gain access to the underside of the screw cover 280 for removal, while still preserving the aesthetically-pleasing appearance associated with not having a widened gap or notch be present at the boundary between the screw cover 280 and the armrest-accepting portion 241 of the middle region 240 of trim panel 200. Moreover, allowing the removal of the fastener cover 280 to take place without the need of a tool reduces the likelihood of forming an unsightly scar in or around the portion of the fastener cover 280 and its adjacent trim panel 200 that would otherwise result from the prying movement of such tool.

Figure 4A:
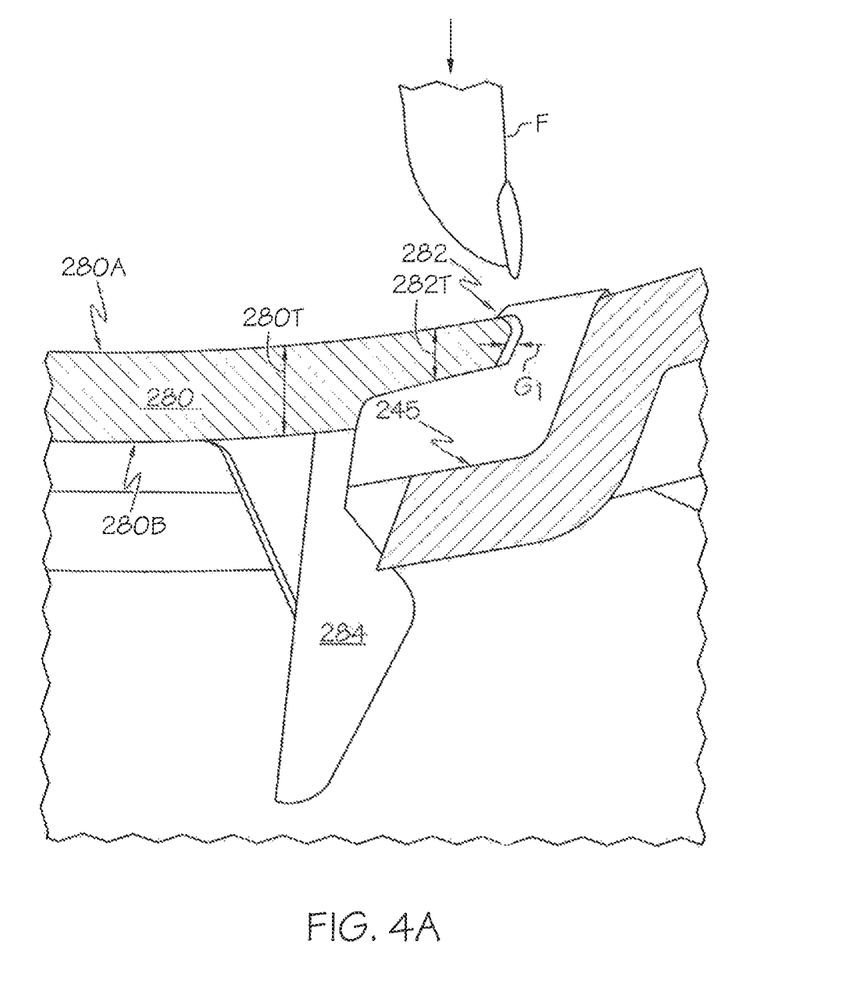
FIG. 4A depicts a cross-sectional view of the screw cover of FIG. 3 in an undeformed state.
Figure 4B:
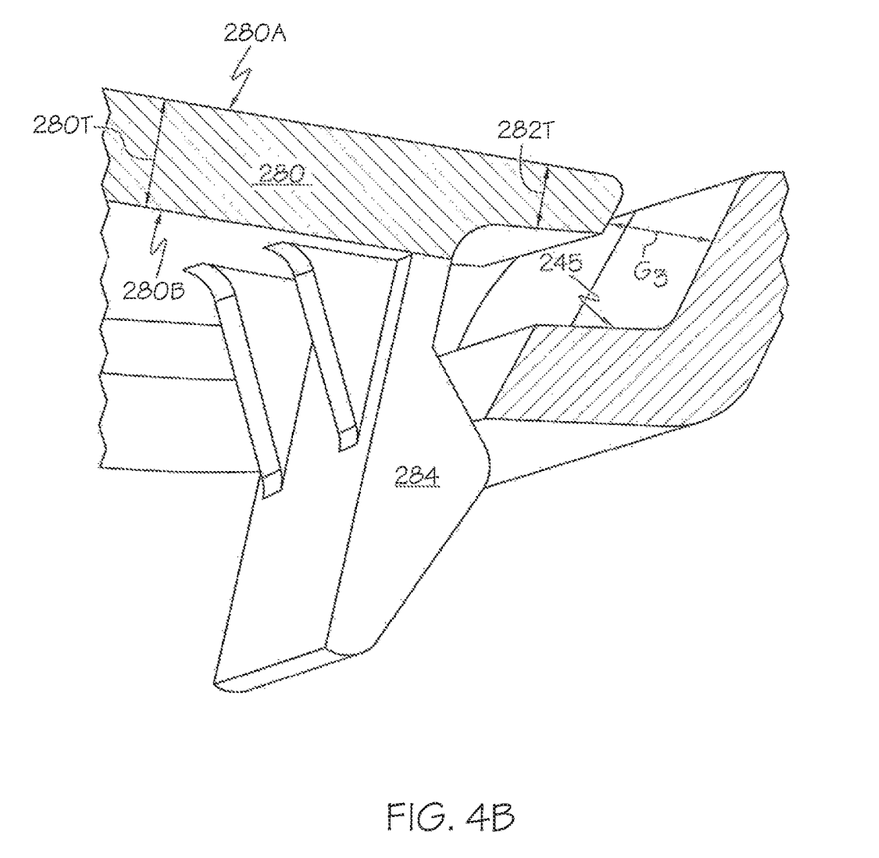
FIG. 4B depicts a cross-sectional view of the screw cover of FIG. 3 in an a deformed state.

Referring next to FIGS. 4A and 4B, edgewise perspective views help to show how the A-surface 280A and the B-surface 280B of the screw cover 280 are oriented, as well as how the screw cover 280 is secured to a locking projection 246 that extends from the adjacent ledge 245 that defines a support within the aperture 244 in the armrest-accepting portion 241 of the middle region 240 of trim panel 200. In particular, the locking projection 246 forms an interference fit with the clip 284 in order to provide securing at the distal end 282 of cover 280, while the friction fit between the locator tabs 283 and the adjacent vertical wall of the pull cup slot 244 provides securing at the proximal end 281 of cover 280. Regarding how the cover 280 is secured within the aperture 244, the surface area dimensions define sizes and shapes of both the cover 280 and the aperture 244 such that they form a close-tolerance fit of one within the other. With such fit, the gap G1 formed between them is made as small as molded component production processes will permit, with the goal of having such gap G1 be as visually unobtrusive as possible. The ledge 245 that extends around the substantial periphery of the pull cup slot of the aperture 244 provides a generally planar resting surface with which to engage the edge 280E of the generally planar lower surface that extends around a majority of the periphery of the cover 280 such that when the two are secured together, the adjacently-facing surfaces are in substantial contact around the peripheries. The portion of the lower peripheral surface of the cover 280 that does not engage the ledge of the aperture 244 corresponds to the local thinned portion 282T.

As mentioned previously, having the adjacent (that is to say, mating) portion of the trim panel 200 be of a more compliant material, structure or both than the screw cover 280, ease of tool-free removal of the screw cover 280 may be promoted. Preferably, the mating part of the trim panel 200 that is across the gap G1 from the A-surface 280A (that is to say, the armrest-accepting portion 241) defines a soft wrap with foam padding. In this way, when service personnel inserts a fingernail into gap G1 near the distal end 282 of screw cover 280, a deflection takes place within the compliant soft material of the armrest-accepting portion 241 to permit the fingernail—which is typically no more than about 1 millimeter in thickness—to get slightly under the local thinned portion 282T for subsequent removal of the cover 280. By avoiding having adjacently-faced components across gap G1 form a so-called "hard-to-hard" fitting, the gap G1 need not even be the width of a fingernail.

In one form, the fingernail prying motion in the narrow gap G1 that is formed between the screw cover 280 and the adjacent surface of the armrest-accepting portion 241 of the middle region 240 is applied upwardly (that is to say, along the positive Y-axis) and slightly inwardly (that is to say, along the negative X-axis). This is sufficient to overcome the frictional bias between the locator tabs 283 and the wall of the pull cup slot that makes up the aperture 244 at the proximal end 281. An additional benefit of the tool-free operation enabled by the screw cover 280 as disclosed herein is that the use of fingertips or fingernails may be applied in areas with limited prying movement, such as that associated with the placement depicted in FIG. 2 and that includes the presence of an armrest and a generally vertical structure in the form of the trim panel 200 that is no more than two to four inches away and could place significant limits on the ability to use a prying motion of a screwdriver, knife or other elongate instrument.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Furthermore, the order of steps associated with such methods may be changed, while various features of the system may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular passenger compartment trim panel assembly comprising:
   a trim panel comprising:
      a trim panel B-surface;
      a trim panel A-surface defining an aperture formed therein; and
      a locking projection that extends into the aperture; and
   a retention assembly comprising:
      a fastener; and
      a fastener cover disposed within the aperture and comprising:
         a fastener cover B-surface with at least one clip formed thereon such that the clip forms an interference fit with the locking projection;
         a fastener cover A-surface sized and shaped such that when the fastener cover is secured within the aperture, a gap formed between them that is visible around a periphery of the fastener cover A-surface defines a substantially constant width; and
         a through-the-thickness dimension that extends from the fastener cover A-surface to the fastener cover B-surface around the periphery, the through-the-thickness dimension comprising a localized thinning in a portion of the periphery that is adjacent the clip such that the clip becomes disengaged from the projection through an amount of prying movement at the gap that is sufficient to remove the interference fit.

2. The trim panel assembly of claim 1, wherein the fastener cover A-surface is substantially coplanar with a portion of the trim panel A-surface that is adjacent the gap.

3. The trim panel assembly of claim 1, wherein the fastener is a screw.

4. The trim panel assembly of claim 1, wherein at least a portion of the trim panel A-surface that is adjacent the fastener cover comprises a material that is more compliant than that of the fastener cover such that the tool-free engagement of the fastener cover at the localized thinning causes preferential deflection within the trim panel.

5. The trim panel assembly of claim 4, wherein the portion of the compliant material of the trim panel A-surface that is adjacent the fastener cover comprises a foam padding.

6. The trim panel assembly of claim 1, wherein the width of the gap is no more than about 1 millimeter.

7. The trim panel assembly of claim 1, wherein the trim panel comprises a door trim panel.

8. The trim panel assembly of claim 1, wherein the fastener cover defines a frictional fit at an end thereof that is substantially opposite of the clip.

9. The trim panel assembly of claim 1, wherein the locking projection forms part of a ledge that provides support for the fastener cover.

10. A vehicular door assembly comprising:
a door comprising
an exterior surface; and
a frame disposed adjacent the outer surface to provide support thereto;
a trim panel secured to the frame and comprising:
a trim panel B-surface; and
a trim panel A-surface defining an aperture formed therein such that the trim panel defines a projection that extends into the aperture; and
a retention assembly comprising:
a fastener; and
a fastener cover disposed within the aperture and comprising:
a fastener cover B-surface with at least one clip formed thereon such that the clip forms an interference fit with the projection;
a fastener cover A-surface sized and shaped such that when the fastener cover is secured within the aperture, a gap formed between them that is visible around a periphery of the fastener cover A-surface defines a substantially constant width; and
a through-the-thickness dimension that extends from the fastener cover A-surface to the fastener cover B-surface around the periphery, the through-the-thickness dimension comprising a localized thinning in a portion of the periphery that is adjacent the clip such that the clip becomes disengaged from the projection through an amount of prying movement at the gap that is sufficient to remove the interference fit.

11. The vehicular door assembly of claim 10, wherein the aperture is formed adjacent an armrest that is formed on the door trim panel.

12. The vehicular door assembly of claim 11, wherein at least a majority of the gap is visually exposed when the armrest is in place.

13. The vehicular door assembly of claim 10, wherein at least one of the surface texture and the surface color of the fastener cover is substantially identical to a corresponding surface texture or surface color of an adjacent portion across the gap of the trim panel.

14. The vehicular door assembly of claim 10, wherein both the surface texture and the surface color of the fastener cover is substantially identical to a corresponding surface texture and surface color of an adjacent portion across the gap of the trim panel.

15. A method of removing a vehicular passenger compartment trim panel, the method comprising:
locating a fastener cover on the trim panel;
inserting a fingernail into a gap formed between the fastener cover and the trim panel where the gap defines a substantially constant width over a periphery of the fastener cover that is exposed to a passenger compartment;
prying the gap open an amount sufficient to move the fastener cover such that an interference fit that is formed between the fastener cover and the trim panel becomes disengaged;
moving the fastener cover an amount sufficient to provide line-of-sight access to a fastener that secures the trim panel to a vehicular structure;
unsecuring the fastener; and
removing the trim panel from the vehicular structure.

16. The method of claim 15, wherein the fastener cover is disposed on an A-surface of the trim panel.

17. The method of claim 15, wherein the fastener cover defines a through-the-thickness dimension that extends from an A-surface to a B-surface thereof and around at least a majority of its periphery, the through-the-thickness dimension comprising a localized thinning in a portion of the periphery that is adjacent a clip formed in the fastener cover such that the prying takes place at the localized thinning.

18. The method of claim 15, wherein the trim panel comprises a door trim panel and the vehicular structure comprises a door frame.

19. The method of claim 15, wherein the portion of the trim panel that is disposed adjacent and across the gap from the fastener cover defines a more compliant structure than that of the fastener cover.

20. The method of claim 19, wherein the more compliant structure is due to at least to the use of a material in the portion of the trim panel that is disposed adjacent and across the gap from the fastener cover that is structurally more compliant than a material used in the fastener cover.

* * * * *

UNITED STATES PATENT AND TRADEMARK OFFICE
CERTIFICATE OF CORRECTION

PATENT NO. : 9,914,406 B1  
APPLICATION NO. : 15/471547  
DATED : March 13, 2018  
INVENTOR(S) : Christopher J. Hemker It is certified that error appears in the above-identified patent and that said Letters Patent is hereby corrected as shown below:

On the Title Page

Item (71), Applicant, delete:
"Toyota Engineering & Manufacturing North America, Inc., Erlanger, KY (US)"
And insert:
--Toyota Motor Engineering & Manufacturing North America, Inc., Erlanger, KY (US)--, therefor.

Signed and Sealed this
Twenty-sixth Day of June, 2018

Andrei Iancu
*Director of the United States Patent and Trademark Office*